Figure 1A:
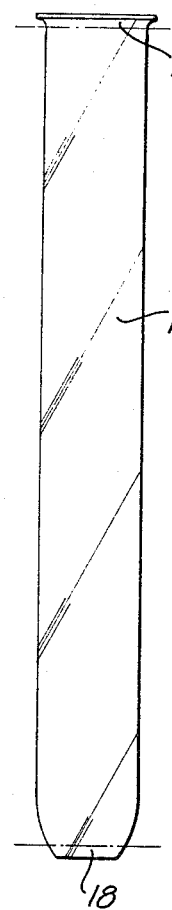

May 14, 1968 E. P. ARTHUR 3,383,299
ISOLATED GLASS TRANSDUCER AND THE METHOD OF MAKING THE SAME
Filed May 3, 1965

INVENTOR.
EDWIN P. ARTHUR
BY HIS ATTORNEYS
HARRIS, KIECH, RUSSELL & KERN

3,383,299
ISOLATED GLASS TRANSDUCER AND THE METHOD OF MAKING THE SAME
Edwin P. Arthur, Fullerton, Calif., assignor to Beckman Instruments, Inc., a corporation of California
Filed May 3, 1965, Ser. No. 452,635
5 Claims. (Cl. 204—195)

This invention relates to glass electrodes suitable for use in ion concentration measurements such as pH evaluation and the like and to a method for their manufacture.

The glass electrode, or electro-chemical transducer, comprises in the generally conventional form a thin glass bulb-like barrier, supported on a tubular stem or extension. The ion responsive barrier glass of the bulb, even in thickness as little as one tenth of a millimeter, exhibits an electrical resistance of many millions of ohms. This makes the device particularly sensitive to static electrical effects when the phase boundary potentials are amplified. Even when the metallic conductor is shielded as described by Cary et al. (U.S. Patent 2,256,733), residual static electrical effects remain. Electrical leakage currents or alternate paths are a source of disturbance, and one way to minimize this factor has been described in U.S. Patent 2,563,062 wherein a conductive covering is placed on the tubular stem of the transducer. Another suggested approach is the development of a film in accordance with Patent No. 2,306,222 to Patnode on the entire transducer as has been illustrated in U.S. Patent No. 2,968,535 but the Patnode film is very fragile and may not be a real coating at all. It is completely transparent to spectral radiation in the visible and near ultraviolet and is also transparent to hydrogen ion concentration in aqueous media, and hence is not suitable for glass electrode applications. A glass electrode, or ion sensitive glass barrier transducer as preferably called, generates a very small D.C. signal. In order to evaluate the signal as distinct from background and static noise, the electrical path to the amplifier should be more completely isolated.

It is a principal object of the invention to provide an improved glass barrier transducer structure wherein the glass bulb or barrier is more effectively isolated than is possible with existing structures.

It is another object of the invention to provide an improved transducer structure which minimizes leakage currents that normally interfere with the accuracy of the phase boundary potential determinations.

It is a still further object of the invention to provide an ion sensitive glass transducer or electrode characterized by relatively high impedance and a signal having little interfering noise.

The invention also comprises novel details of design and manufacture which will more fully appear in the course of the following description. The drawing shows, and the description describes, a preferred embodiment of the present invention which is given by way of illustration or example.

Figure 2A:
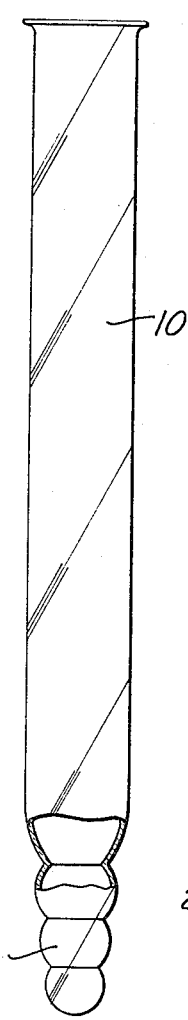
Figure 2B:
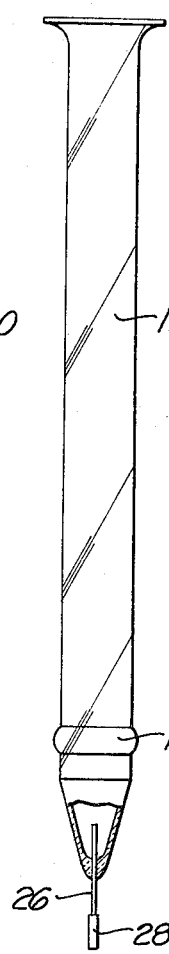
Figure 3:
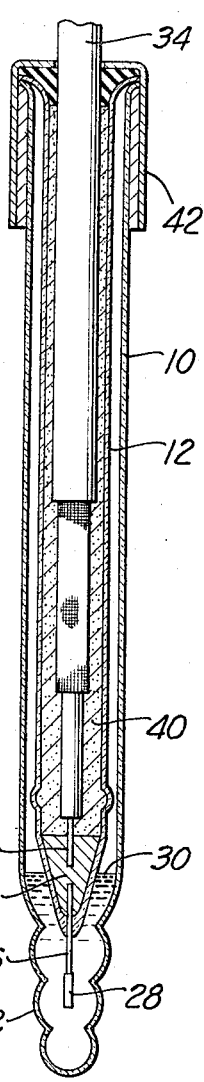

In the drawing:

FIGS. 1 through 3 show progressive steps in a preferred method of manufacture of the glass electrode of the invention.

Figure 1B:
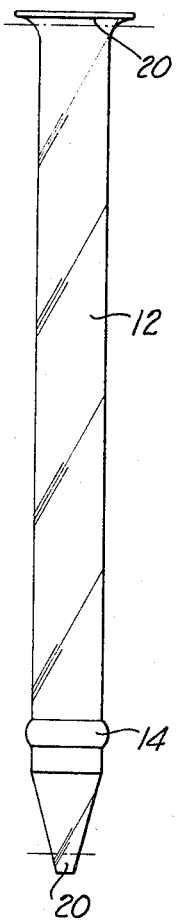

There is illustrated in FIG. 1(a) a conventional stem or body tube 10 sometimes called an insulating glass tubular extension formed of glass having a high electrical resistance. In the particular tube 10 illustrated, one end is slightly flared and the other is partially closed. An internal tubular member 12 of considerably less diameter than body tube 10 having a flared upper end and a tapered lower end with a bulge 14 immediately above the taper is illustrated in FIG. 1(b).

In the manufacturing process of the invention, the body tube 10 and internal tubular member 12 are dipped in solvent solution of a polymeric organosiloxane. The solvent is permitted to evaporate, leaving a coating on the glass of the two members, which coating is believed to combine with the water bound to the lattice of the glass. The film produced solely by evaporation of the solvent is fragile and will not serve the intended purpose of the instant invention. The coated body tube 10 and internal tubular member 12 are placed in an oven and subjected to heat treatment generally within the range of 200° C. to 350° C. Among the suitable polysiloxanes are the alkyl hydrogen polysiloxanes such as methyl or ethyl hydrogen polysiloxanes or others of the polymeric organosiloxanes such as the products marketed under the trademark General Electric DF 1040, Dow Corning DC 1107, and Union Carbide L–31, etc. The material may be applied by brushing, spraying or dipping in a dilute (10% or less) volatile solvent (methyl chloroform) and after air drying, polymerized by heat, 200° C. (even as high as 350° C.) to make a hard, tough, tenacious coating on glass. Suitable polymeric organosiloxane materials are characterized by being "heat set" in a film at temperatures less than their boiling points. A large number of solvents, principally low boiling polar solvents such as acetone, n-butanol, methanol, butyl acetate and isopropanol and methyl chloroform may be used in the formation of the solution, through which the organosiloxane is applied. Additionally, aromatic materials including xylene and toluene are available as solvents. Hexane and mineral spirits may also be employed.

The body tube 10 and internal tubular member 12 after removal from the oven will each be substantially covered by the polymerized silicone coating and in order to complete the manufacture of the device it is necessary to remove the coating from certain limited areas. In an alternative procedure of manufacture, the limited areas are masked prior to application of the siloxane solutions. Each of the two members 10 and 12 is subjected to a limited sand blasting or acid etching to remove the coating therefrom in the end areas 18 and 20, respectively; set off by phantom lines in FIGS. 1(a) and 1(b). Following the removal of the silicone coating from its opposite ends, the body tube 10 has formed thereon an ion responsive membrane or bulb 22 as illustrated in FIG. 2(a). The bulb 22 is conveniently formed on the body tube 10 in accordance with the process described in U.S. Patent No. 3,070,540, James and Nolan, issued Dec. 25, 1962. Of course, other shapes of bulb and processes for formation may be utilized if desired. In the procedure described in the latter patent a gob of molten glass of which the membrane is to be formed is taken up into the tube 10. This is accomplished by positioning the smaller end of the tube 10 slightly into a body of molten glass and applying a vacuum to the tube to draw the gob of glass into the tube end. A typical furnace and glass melt suitable for use for this purpose is described in U.S. Patent No. 2,346,470, Cary and Baxter. The tube is maintained in contact with the molten body of glass for a period of time sufficient to wet the entire periphery of the end and provide a seal between the end and the gob of glass taken up by the tube. Thereafter the bulb 22 is formed through a sequence of blowing steps which are described in greater detail in the aforementioned U.S. Patent No. 3,070,540.

A silver wire 26 coated with silver chloride 28 is fused in the lower tapered end of the internal tubular member 12 as best seen in FIG. 2(b). A suitable electrolyte 30, FIG. 3, such as a potassium acid phthalate buffer at pH 4 0.01 M in chlorides is placed in the bulb 22 of the body tube 10. Thereafter, the internal tubular member 12 is positioned within the outer body tube 10 and the respective upper flanges of the two members are fused to provide a hermetically sealed structure with substantially all portions of the structure being covered with the polymerized silicone coating except for the glass bulb 22.

A conventional coaxial cable conductor 34 including an outer shield is positioned within the internal tubular member 12 with an exposed wire 36 at the inner end of the conductor being secured in place at the lower inner end of the internal tubular member 12 by one of the known conductive cements 38. The cable conductor 34 is retained within the tubular member 12 by a suitable insulating material 40 such as a polymerized silicone resin. A cap 42 through which the conductor 34 extends is placed over the upper ends of the body tube 10 and internal tubular member 12 to complete the structure.

The organosiloxane coating may be applied to various glass electrodes which are employed for measurement of various ion concentrations including hydrogen, sodium and the like. The cured or polymerized siloxane film of the device of the invention is almost entirely opaque to the effect of hydrogen ion concentration. The in situ polymerized coating does not "creep" on the glass surface as is characteristic of methyl silicones and so-called silicone oils. It has been shown that creeping has a ruinous effect on the hydrogen ion response of a glass barrier.

Although an exemplary embodiment of the invention has been disclosed and discussed, it will be understood that various other embodiments of the invention may be subjected to various changes, modifications, and substitutions without necessarily departing from the spirit of the invention.

I claim:
1. A device for electrical determination of ion concentration comprising a glass electrode having an ion responsive membrane and an insulating glass extension, said glass extension having at least part of its surface coated with a polymerized organosiloxane, said organosiloxane having been polymerized in situ on the glass extension.

2. A device for electrical determination of ion concentration comprising a glass electrode having an ion responsive membrane and an insulating glass extension, said glass extension having at least part of its surface coated with an alkyl hydrogen polysiloxane, with said polysiloxane having been polymerized in situ on the glass extension.

3. A device for electrical determination of ion concentration comprising a glass electrode having an ion responsive membrane and an insulating glass tubular extension, said glass tubular extension having at least part of its surface coated with methyl hydrogen polysiloxane with said polysiloxane having been polymerized in situ on the glass tubular extension.

4. In a method of fabricating an improved structure for electrical determination of ion concentrations having an ion responsive membrane supported by an insulating glass member, the improvement comprising:
   forming a coating of an organosiloxane on the insulating glass member; and
   heating the coated glass member at a temperature below the boiling point of the organosiloxane to heat set said organosiloxane in situ.

5. A method in accordance with claim 4 wherein the organosiloxane is an alkyl hydrogen polysiloxane.

References Cited
UNITED STATES PATENTS 3,224,436   12/1965   Le Massena _____ 204—195

HOWARD S. WILLIAMS, *Primary Examiner.*

T. TUNG, *Assistant Examiner.*